(12) United States Patent  
Okitsu et al.

(10) Patent No.: US 8,437,151 B2  
(45) Date of Patent: May 7, 2013

(54) SELF-EXCITED SWITCHING POWER SUPPLY CIRCUIT

(75) Inventors: Katsuhiko Okitsu, Saitama (JP); Toshihiro Amei, Tokyo (JP); Kenji Hatano, Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 13/413,661

(22) Filed: Mar. 7, 2012

(65) Prior Publication Data

US 2012/0230061 A1 Sep. 13, 2012

(30) Foreign Application Priority Data

Mar. 11, 2011 (JP) ................................. 2011-054258

(51) Int. Cl.  
*H02M 3/335* (2006.01)

(52) U.S. Cl.  
USPC ............................................. 363/18; 363/19

(58) Field of Classification Search .................... 363/18, 363/19, 20, 21.01, 21.04, 21.07, 21.12, 21.15, 363/21.16, 21.17  
See application file for complete search history.

(56) References Cited

U.S. PATENT DOCUMENTS

| | | | | |
|---|---|---|---|---|
| 6,078,508 A | * | 6/2000 | Okamura et al. | 363/19 |
| 8,035,999 B2 | * | 10/2011 | Huang et al. | 363/19 |
| 2002/0136031 A1 | * | 9/2002 | Yamaguchi et al. | 363/18 |
| 2004/0252526 A1 | * | 12/2004 | Amei | 363/18 |

FOREIGN PATENT DOCUMENTS

JP 3691498 B2 9/2005

* cited by examiner

*Primary Examiner* — Nguyen Tran  
(74) *Attorney, Agent, or Firm* — Ryuka

(57) ABSTRACT

There is provided a self-excited switching power supply circuit which shifts to continuous oscillating operation immediately after the self-excited switching power supply circuit is connected to an AC power supply and started and which does not cause start-up failure while using a start-up resistor of a high resistance value to maintain standby power consumption at a low level. A bypass charging circuit connected in series to a start-up resistor is connected between a high-voltage side terminal of a DC input power supply and the gate of an oscillation field effect transistor. A charging current flowing in the start-up resistor, and additionally, a charging current to charge a start-up capacitor through the bypass charging circuit flow in a transitional period during which the voltage of the DC input power supply increases.

3 Claims, 7 Drawing Sheets

SELF-EXCITED SWITCHING POWER SUPPLY CIRCUIT

CROSS REFERENCE TO RELATED APPLICATION

The contents of the following Japanese patent application are incorporated herein by reference,
NO. 2011-054258 filed on Mar. 11, 2011.

BACKGROUND

1. Technical Field

The present invention relates to a self-excited switching power supply circuit, and more specifically, to a flyback self-excited switching power supply circuit in which energy stored in a transformer is emitted from a secondary output winding to a load when an exciting current flowing in a primary winding of the transformer is stopped.

2. Description of the Related Art

A switching power supply circuit functioning as a stabilizing circuit for converting a commercial AC voltage to a DC voltage and outputting the resultant voltage is used in a battery charger, a motor and the like provided with a DC-DC converter. A driving system (switching system) of a switching element is roughly divided into a self-excited oscillation system and a separately-excited oscillation system. The self-excited oscillation system performs oscillating operation by feeding a voltage appearing across a feedback winding of an inductance member such as a transformer back positively as a driving signal to a control terminal of a switching element. A self-excited switching power supply circuit employing the self-excited oscillation system is known conventionally (Japanese Patent No. 36914798).

A conventional self-excited switching power supply circuit 100 is described with reference to FIG. 8. In the self-excited switching power supply circuit 100, a capacitor-input rectifying and smoothing circuit with a bridge rectifier 7 and a smoothing capacitor 1 is connected to a commercial AC power supply AC through a power supply switch 4. Further, an unstable DC voltage obtained by rectifying and smoothing a commercial AC voltage is generated between a high-voltage side terminal 1a and a low-voltage side terminal 1b of the smoothing capacitor 1, and the generated voltage is used as a DC input power supply.

Reference numeral 2 shows a transformer including a primary winding 2a, a first feedback winding 2b wound in the same direction as the primary winding 2a, and a second feedback winding 2d wound in the opposite direction to the primary winding 2a that are provided on the primary side, and a secondary output winding 2c provided on the secondary side. Reference numeral 3 shows an oscillation field effect transistor (hereinafter abbreviated as FET). Reference numeral 21 shows a start-up resistor used to apply a forward bias (in other words, a gate voltage being equal to or higher than a threshold voltage $V_{TH}$) to the gate of the FET 3 when the circuit is started. An electric resistor 25 connected in series to the start-up resistor 21 has a resistance value smaller than that of the start-up resistor 21. Thus, when the charging voltage of the smoothing capacitor 1 (input voltage of DC input power supply) is divided and if a low DC voltage is output, the circuit is not started.

Reference numeral 6 shows a Zener diode provided to prevent excessive input to the gate of the FET 3. Reference numeral 12 shows a start-up capacitor connected in series to a feedback resistor 11 and connected between the feedback winding 2b and the gate of the FET 3. Reference numeral 24 shows an electric resistor provided to prevent excessive input to the gate of the FET 3, and reference numeral 5 shows an OFF control transistor element having a collector connected to the gate of the FET 3, and an emitter connected to the low-voltage side terminal 1b. The base of the OFF control transistor 5 is connected to a junction between the FET 3 and a primary current detecting resistor 51 through an electric resistor 52, and to the low-voltage side terminal 1b through an OFF control capacitor 53.

An output side rectifying and smoothing circuit 26 with a rectifying diode and a smoothing capacitor is connected to the secondary output winding 2c. The output side rectifying and smoothing circuit 26 rectifies and smoothes the output of the secondary output winding 2c, and gives the resultant output between a high-voltage side output line 20a and a low-voltage side output line 20b.

In the self-excited switching power supply circuit 100 of the aforementioned structure, when the power supply switch 4 is turned on to connect the self-excited switching power supply circuit 100 to the commercial AC power supply AC and start the self-excited switching power supply circuit 100, the smoothing capacitor 1 is charged with a sinusoidal voltage obtained by full-wave rectification at the bridge rectifying circuit 6. Then, an input voltage of the DC input power supply that increases from 0 V to 141 V appears as shown in FIG. 9 between the high-voltage side terminal 1a and the low-voltage side terminal 1b of the smoothing capacitor 1. In response to the increase of the input voltage of the DC input power supply, the start-up capacitor 12 (in FIG. 8, the lower electrode is a positive electrode and the upper electrode is a negative electrode) is charged through the start-up resistor 21. This gradually increases the charging voltage of the start-up capacitor 12 to increase the gate voltage of the FET 3 as shown in FIG. 11. When the charging voltage of the start-up capacitor 12 reaches the threshold voltage $V_{TH}$ and a forward bias voltage is applied to the gate of the FET 3, the FET 3 is turned on.

When the FET 3 is turned on and an exciting current starts to flow from the smoothing capacitor (DC input power supply) 1 to the primary winding 2a connected in series to the FET 3, induced electromotive force is generated in each winding of the transformer 2 to store exciting energy in the transformer 2. In response to increase of a current flowing in the primary winding 2a, the OFF control capacitor 53 is charged with a voltage across the primary current detecting resistor 51 to increase the base voltage of the OFF control transistor 5. An induced voltage generated in the feedback winding 2b is superimposed on the charging voltage of the start-up capacitor 12 during the ON period of the FET 3, so that the gate voltage of the FET 3 is maintained at the threshold voltage $V_{TH}$ of the FET 3 or a level higher than the threshold voltage $V_{TH}$.

A current flowing in the primary winding 2a increases in proportion to time elapsed after the FET 3 is turned on. The charging voltage of the OFF control capacitor 53 to be charged with a voltage across the primary current detecting resistor 51 also increases. If the base voltage of the OFF control transistor 5 reaches a predetermined bias voltage, the OFF control transistor 5 performs ON operation. This provides continuity between the collector and the emitter of the OFF control transistor 5 to bring the gate of the FET 3 into a state where the gate of the FET 3 is substantially shorted with the low-voltage side terminal 1b, thereby turning the FET 3 off.

When the FET 3 is turned off and a current flowing in the transformer 2 is interrupted substantially, a voltage what is called a flyback voltage (induced counter-electromotive force) is generated in each winding. The flyback voltage generated in the secondary output winding 2c is rectified and smoothed by the output side rectifying and smoothing circuit 26, and is output as electric power to be supplied to a load connected between the output lines 20a and 20b. During the OFF period of the FET 3, the start-up capacitor 12 is charged with a flyback voltage generated in the feedback winding 2b and supplied through a charging path formed by the Zener diode 6 and the feedback resistor 11, and with the charging voltage (input voltage of the DC input power supply) of the smoothing capacitor 1 supplied through a charging path formed by the start-up resistor 21.

If emission of electric energy stored in the secondary output winding 2c is finished by the induced counter-electromotive force, the flyback voltage of the feedback winding 2b functioning as a reverse bias for the gate of the FET 3 drops. Then, the charging voltage supplied to the start-up capacitor 12 during the OFF period of the FET 3 makes the gate voltage of the FET 3 exceed the threshold voltage $V_{TH}$ to turn the FET 3 on again. A series of the aforementioned oscillating operation is repeated.

As described above, the start-up capacitor 12 is charged with the flyback voltage generated in the feedback winding 2b and through the smoothing capacitor 1 during the OFF period of the FET 3. However, the flyback voltage substantially proportionate to the input voltage of the DC input power supply is low at a moment immediately after the self-excited switching power supply circuit 100 is connected to the commercial AC power supply AC and started. Accordingly, the start-up capacitor 12 is charged mainly with the DC input power supply appearing across the smoothing capacitor 1 through the start-up resistor 21.

Meanwhile, a discharging current always flows from the smoothing capacitor 1 to the start-up resistor 21 irrespective of the operating condition of the FET 3. Accordingly, a resistor having a high resistance value of 10 MΩ or higher is used to reduce power consumption by the start-up resistor 21. Thus, the start-up capacitor 12 is charged at a low speed when the self-excited switching power supply circuit 100 is started, and intermittent oscillation is repeated that always involves an OFF period of from about 0.7 msec to about 1.8 msec as shown in FIGS. 10 and 11.

The self-excited switching power supply circuit 100 includes a current monitoring circuit 54 for monitoring an output current flowing in the output lines 20a and 20b, and a voltage monitoring circuit 55 for monitoring an output voltage between the output lines 20a and 20b. The self-excited switching power supply circuit 100 further includes an output control circuit 56 for controlling the output current and the output voltage at levels not exceeding a constant set current and a constant set voltage, respectively, at the primary side of the transformer 2 on the basis of values obtained as a result of the monitoring.

To be specific, the output control circuit 56 includes a driving capacitor 37 to be charged with the flyback voltage generated in the second feedback winding 2d of the transformer 2 during the OFF period of the FET 3. If the output current flowing in the high-voltage side output line 20a and the low-voltage side output line 20b, or the output voltage between the output lines 20a and 20b exceeds the set current or the set voltage, a photocoupler light emitting element 35 emits light. A photocoupler light receiving element 36 is optically coupled to the photocoupler light emitting element 35, and causes a discharging current proportionate to the amount of light received by the photocoupler light receiving element 36 to flow from the driving capacitor 37 to the base of the OFF control transistor 5.

Accordingly, after the FET 3 is turned on, a voltage generated in the primary current detecting resistor 51 as a result of flow of a current in the primary winding 2a, and a voltage generated in the electric resistor 52 as a result of flow of the aforementioned discharging current, are applied together to the base of the OFF control transistor 5, thereby increasing the base voltage at a higher speed. Accordingly, the OFF control transistor 5 performs ON operation promptly to turn the FET 3 off, thereby shortening turn-on time. Further, the output current or the output voltage is reduced to the set current or the set voltage, or to a level lower than the set current or the set voltage, thereby achieving constant current control and constant voltage control.

The set voltage is set at the operating voltage of the load connected between the output lines 20a and 20b. In order to protect each circuit element of the self-excited switching power supply circuit 100, the set current is set at a value higher than the operating current that allows the load to operate stably.

When the power supply switch 4 is turned on to connect the self-excited switching power supply circuit 100 to the commercial AC power supply AC and start the self-excited switching power supply circuit 100, the output current and the output voltage of the self-excited switching power supply circuit 100 repeats the aforementioned intermittent oscillating operation to increase the output current gradually. If the output current reaches the set current, the output voltage increases gradually under the constant current control as indicated by PS' of FIG. 12. If the output voltage reaches the set voltage thereafter corresponding to the operating voltage of the load, the output current decreases gradually under the constant voltage control. If the output current reaches the operating current of the load, the output voltage and the output current appropriate for the load are output stably while the oscillating operation is repeated.

Various loads may be connected between the output lines 20a and 20b of the conventional self-excited switching power supply circuit 100. However, regarding a load such as a motor and a DC-DC converter, an operating voltage and an operating current thereof are not proportionate to each other until the load is put into stable operation. As seen from L of FIG. 12, for example, the operating current of such a load at initial time is high at a level of about 0.4 A, and is reduced slowly thereafter in response to increase of the operating voltage. The load operates stably at the operating voltage of 5.5 V and the operating current of about 0.18 A (S1 of FIG. 12).

Meanwhile, the self-excited switching power supply circuit 100 repeats the intermittent oscillating operation immediately after the self-excited switching power supply circuit 100 is connected to the commercial AC power supply AC and started. As seen from PS' of FIG. 12, the output characteristics of the self-excited switching power supply circuit 100 are such that an initial output current (short-circuit current) after the self-excited switching power supply circuit 100 is started is low at a level of about 0.02 A, and that an output current increases while an output voltage of about 0.4 V is maintained. Accordingly, if an output current increases while intermittent oscillating operation is repeated as shown by S2 of FIG. 12, a corresponding output voltage and the output current of S2 agree with the operating characteristics of a load indicated by L of FIG. 12. In this case, electric power exceeding the output indicated as S2 is not required, so that the intermittent oscillating operation is repeated. As a result, the output of the self-excited switching power supply circuit 100 will not reach S1 of FIG. 12 at which the load operates stably, causing what is called a start-up failure.

This start-up failure may be prevented by increasing a speed at which the start-up capacitor 12 is charged immediately after the self-excited switching power supply circuit 100 is started to shorten an OFF period of the intermittent oscillating operation, thereby increasing an initial output current (short-circuit current). However, this in turn requires reduction of the resistance value of the start-up resistor 21. Using the start-up resistor 21 of a reduced resistance value generates flow of a current even in a standby state where a load is not connected, leading to a different problem of increase of standby power consumption.

SUMMARY

The present invention has been made in consideration of the aforementioned conventional problems. It is an object of the invention to provide a self-excited switching power supply circuit which shifts to continuous oscillating operation immediately after the self-excited switching power supply circuit is started and which does not cause start-up failure while using a start-up resistor of a high resistance value to maintain standby power consumption at a low level.

In order to achieve the aforementioned object, a self-excited switching power supply circuit according to a first aspect of the present invention includes: a smoothing capacitor for generating a DC input power supply between a high-voltage side terminal and a low-voltage side terminal, the DC input power supply being generated by rectifying and smoothing a commercial AC power supply; a transformer with a primary winding, a secondary output winding, and a feedback winding; an oscillation field effect transistor connected in series to the primary winding and connected between the high-voltage side terminal and the low-voltage side terminal; a start-up resistor connected between the high-voltage side terminal and a gate of the oscillation field effect transistor; a start-up capacitor connected between one side of the feedback winding and the gate of the oscillation field effect transistor, an opposite side of the feedback winding being connected to the low-voltage side terminal, the start-up capacitor applying a voltage for controlling ON of the oscillation field effect transistor to the gate; and a control switching element connected between the gate of the oscillation field effect transistor and the low-voltage side terminal, the control switching element emitting the charging voltage of the start-up capacitor after elapse of a predetermined time after the oscillation field effect transistor is turned on, thereby controlling OFF of the oscillation field effect transistor. The self-excited switching power supply circuit rectifies and smoothes a flyback voltage generated in the secondary output winding after the oscillation field effect transistor is turned off, and outputs the resultant flyback voltage. The most principal features of the self-excited switching power supply circuit lay in that a bypass charging circuit connected in parallel to the start-up resistor is connected between the high-voltage side terminal and the gate of the oscillation field effect transistor, and that the bypass charging circuit causes a charging current for charging the start-up capacitor to flow from the high-voltage side terminal at least in a fixed period of a transitional period during which the voltage of the DC input power supply increases.

From a time immediately after the self-excited switching power supply circuit is connected to the commercial AC power supply and started, the input voltage of the DC input power supply functioning as the charging voltage of the smoothing capacitor increases from 0 V to a peak voltage. The start-up capacitor is charged through a charging path in which the bypass charging circuit is interposed as well as through a charging path in which the start-up resistor is interposed at least in the fixed period of the transitional period during which the input voltage of the DC input power supply increases from 0 V. Thus, even with the start-up resistor having a high resistance value, an OFF period from when the oscillation field effect transistor is turned off and until when the oscillation field effect transistor is turned on next time is shortened to realize continuous oscillating operation even in the transitional period. As a result, an initial output current higher than the operating current of a load is output immediately after the self-excited switching power supply circuit is started, thereby preventing start-up failure.

After elapse of the transitional period during which the voltage of the DC input power supply reaches the peak value, the voltage of the DC input power supply shifts to a stationary state where a ripple voltage having a cycle corresponding to a half cycle of the commercial AC power supply is superimposed on the voltage of the DC input power supply. After shift to the stationary state, flow of a charging current in the bypass charging circuit stops. Thus, use of the start-up resistor having a high resistance value reduces power consumption.

The self-excited switching power supply circuit according to a second aspect of the present invention is characterized in that the bypass charging circuit includes a start-up auxiliary resistor and a coupling capacitor connected in series.

The presence of the start-up auxiliary resistor connected in series generates a potential difference between the charging voltage of the coupling capacitor and the input voltage of the DC input power supply in the transitional period. This causes a charging current charging the coupling capacitor to flow into the start-up capacitor through the start-up auxiliary resistor connected in series, thereby charging the start-up capacitor in an auxiliary manner.

Meanwhile, if the input voltage of the DC input power supply is substantially stabilized in the stationary state, the coupling capacitor is saturated to eliminate the potential difference from the voltage of the DC input power supply, thereby stopping flow of a charging current in the start-up auxiliary resistor.

The self-excited switching power supply circuit according to a third aspect of the present invention is characterized in that a Zener diode having a Zener voltage lower than the voltage of the DC input power supply measured after elapse of the transitional period is connected in series to the bypass charging circuit.

A charging current does not flow in the coupling capacitor until the voltage of the DC input power supply to increase from 0 V after the self-excited switching power supply circuit is started reaches the Zener voltage. Connecting the Zener diode in series to the coupling capacitor reduces a potential difference generated in the transitional period between the charging voltage of the coupling capacitor and the voltage of the DC input power supply. As a result, a charging current flowing from the bypass charging circuit to charge the start-up capacitor is reduced. Thus, the Zener voltage of the Zener diode is capable of delaying a speed at which the start-up capacitor is charged, and which is increased by the provision of the bypass charging circuit.

According to the first aspect of the present invention, use of the start-up resistor having a high resistance value is also capable of making a shift to the continuous oscillating operation in the transitional period during which the voltage of the DC input power supply measured immediately after the self-excited switching power supply circuit is started increases. This makes it possible to prevent start-up failure while avoiding increase of power consumption.

According to the second aspect of the present invention, a simple structure with the start-up auxiliary resistor and the coupling capacitor connected in series can form the bypass charging circuit for causing a charging current to charge the start-up capacitor to flow in the transitional period immediately after the self-excited switching power supply circuit is started, and for causing the charging current to stop on its own after elapse of the transitional period.

According to the third aspect of the present invention, the Zener voltage of the Zener diode is capable of controlling a speed in an arbitrary manner at which the start-up capacitor is charged immediately after the self-excited switching power supply circuit is started. This makes it possible to control an OFF period from when the oscillation field effect transistor is turned off and until when the oscillation field effect transistor is turned on. Thus, the oscillation field effect transistor is turned on before the polarity of each winding is reversed by emission of energy from the transformer, making it possible to prevent flow of an excessive reverse current into each circuit element.

DESCRIPTION OF EXEMPLARY EMBODIMENTS

Figure 1:
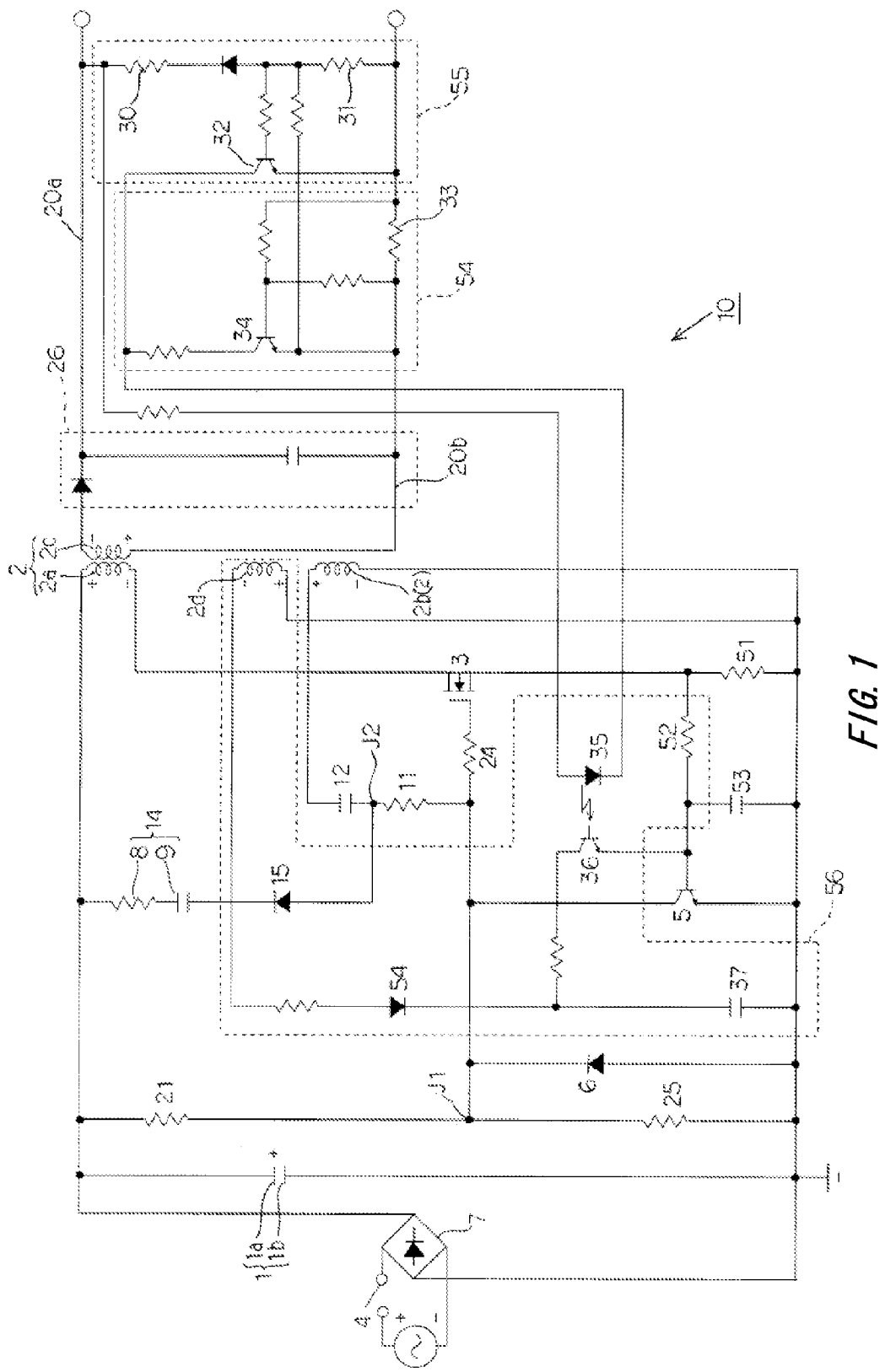
FIG. 1 is a circuit diagram of a self-excited switching power supply circuit 10 according to one embodiment of the present invention.

An embodiment of the present invention will be described in detail with reference to FIGS. 1 to 7. FIG. 1 is a circuit diagram showing the structure of a self-excited switching power supply circuit 10 according to the embodiment of the invention. A principal circuit and principal circuit elements of the self-excited switching power supply circuit 10 according to the embodiment are the same as those of the conventional self-excited switching power supply circuit 100 shown in FIG. 8. Accordingly, the structures in common are identified by the same reference numerals, and will not be described in detail.

As shown in FIG. 1, in the self-excited switching power supply circuit 10, a capacitor-input rectifying and smoothing circuit with a bridge rectifier 7 and a smoothing capacitor 1 is connected to a commercial AC power supply AC of 100 V through a power supply switch 4. An AC voltage having a peak value of 141 V is subjected to full-wave rectification at the bridge rectifier 7, and a resultant voltage having a waveform in which a half cycle of a sinusoidal wave appears repeatedly is supplied to the smoothing capacitor 1 and is smoothed by the smoothing capacitor 1. A DC voltage on which a ripple voltage generated between a high-voltage side terminal 1a and a low-voltage side terminal 1b of the smoothing capacitor 1 is superimposed is used as a DC input power supply (hereinbelow, the smoothing capacitor 1 is simply called a DC input power supply, and the charging voltage of the smoothing capacitor 1 is called an input voltage). Accordingly, the input voltage of the DC input power supply increases from 0 V measured immediately after the power supply switch 4 is closed and the self-excited switching power supply circuit 10 is connected to the commercial AC power supply AC and started to the peak value of 141 V (hereinbelow, a period during which a voltage measured before the self-excited switching power supply circuit 10 is connected to the commercial AC power supply AC increases to the peak value is called a transitional period). If the input voltage reaches the peak value, the smoothing capacitor 1 repeats charge and discharge by following a voltage waveform obtained by full-wave rectification of the commercial AC power supply AC. Then, the input voltage shifts to a stationary state where the waveform of a ripple voltage appears in the vicinity of the peak value.

A primary winding 2a of a transformer 2 is connected to the DC input power supply 1 while being connected in series to an oscillation field effect transistor (hereinafter abbreviated as FET) 3. ON and OFF operations of the FET 3 control ON and OFF of a current to flow in the primary winding 2a. Here, a MOSFET is used as the FET 3. The FET 3 has a drain connected to the primary winding 2a, and a source connected through a primary current detecting resistor 51 to the low-voltage side terminal 1b of the DC input power supply 1.

The gate of the FET 3 is connected through an electric resistor 24 for preventing excessive input to the gate of the FET 3 to a junction J1 between a start-up resistor 21 and an electric resistor 25 connected in series and connected to the DC input power supply 1. Like in the conventional circuit shown in FIG. 8, the respective resistance values of the start-up resistor 21 and the electric resistor 25 are 14.1 MΩ and 750 kΩ. Thus, even if the unstable DC input power supply 1 of approximately 141 V is applied across the start-up resistor 21 and the electric resistor 25, only an extremely weak current of about 9.5 µA flows in the start-up resistor 21. This allows significant reduction of power to be consumed by the start-up resistor 21.

A start-up capacitor 12 and a feedback resistor 11 affecting the ON operation of the FET 3 are connected in series between the junction J1 between the start-up resistor 21 and the electric resistor 25, and one side of a first feedback winding 2b. The opposite side of the first feedback winding 2b is connected to the low-voltage side terminal 1b of the DC input power supply 1.

Figure 2:
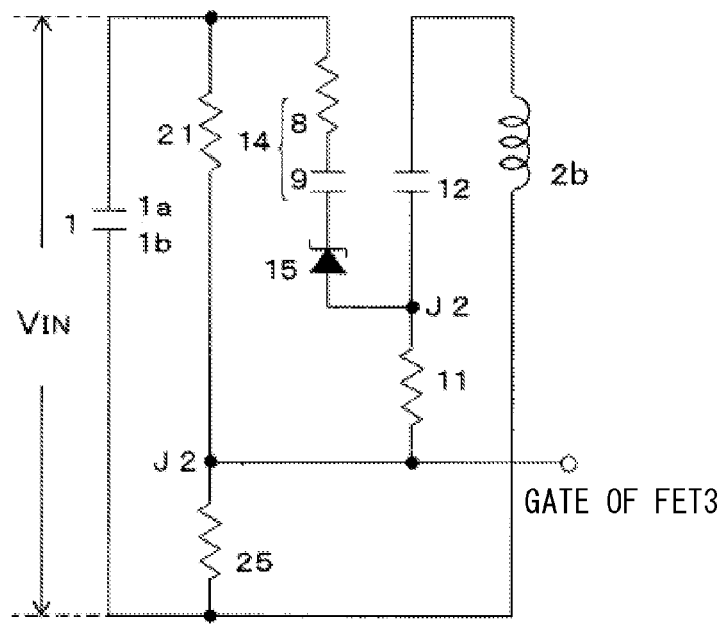
FIG. 2 is a circuit diagram of principal part of the self-excited switching power supply circuit 10.

In the embodiment, unlike the conventional circuit, a start-up auxiliary resistor 8 and a coupling capacitor 9 forming a bypass charging circuit 14, and a Zener diode 15 are connected in series between a junction J2 between the start-up resistor 12 and the feedback resistor 11, and the high-voltage side terminal 1a of the DC input power supply 1 as shown in FIG. 2.

The resistance value of the start-up auxiliary resistor 8 is 470 kΩ, and the capacitance of the coupling capacitor 9 is 0.0047 µF. This saturates the coupling capacitor 9 in approximately 14 msec longer than 5 msec corresponding to time during which the transitional period after the start of the self-excited switching power supply circuit 10 elapses (see FIG. 3).

The Zener diode 15 has a cathode connected to the bypass charging circuit 14 on the same side as the high-voltage side terminal 1a, and an anode connected to the junction J2. This prevents flow of a charging current in the bypass charging circuit 14 even in the transitional period until the voltage of the DC input power supply 1 reaches the Zener voltage of the Zener diode 15. Accordingly, the Zener voltage is lower at least than the peak value of 141 V. The Zener diode 15 used here has a Zener voltage of 39 V.

An OFF control transistor 5 functioning as a switching element for controlling OFF of the FET 3 by reducing the gate voltage of the FET 3 is provided between the junction J1 between the start-up resistor 21 and the electric resistor 25, and the low-voltage side terminal 1b. Here, an NPN transistor is used as the OFF control transistor 5. The OFF control transistor 5 has a collector connected to the junction J1, and an emitter connected to the low-voltage side terminal 1b. The base of the OFF control transistor 5 is connected through an OFF control capacitor 53 to the low-voltage side terminal 1b. The base of the OFF control transistor 5 is also connected through an electric resistor 52 to the high-voltage side of the primary current detecting resistor 51. If voltage drop caused by the primary current detecting resistor 51 reaches a fixed value or becomes higher than the fixed value, a base voltage represented as the charging voltage of the OFF control capacitor 53 increases to cause the OFF control transistor 5 to perform ON operation.

One side of a second feedback winding 2d is connected to the low-voltage side terminal 1b of the DC input power supply 1 through a rectifying diode 54 and a driving capacitor 3 connected in series. Further, the opposite side of the second feedback winding 2d is directly connected to the low-voltage side terminal 1b of the DC input power supply 1, thereby forming a closed loop. The rectifying diode 54 is arranged such that the forward direction thereof agrees with a direction in which the rectifying diode 54 is connected to the driving capacitor 37, so that the driving capacitor 37 is charged with a flyback voltage generated in the second feedback winding 2d. A junction between the rectifying diode 54 and the driving capacitor 37 is connected through a photocoupler light receiving element 36 to the base of the OFF control transistor 5.

The photocoupler light receiving element 36 is put into operation by being optically coupled to a photocoupler light emitting element 35 belonging to the secondary side of the transformer 2. While receiving light emitted from the photocoupler light emitting element 35, the photocoupler light receiving element 36 causes a discharging current emitted from the driving capacitor 37 to flow therein in proportion to the amount of the received light.

An output side rectifying and smoothing circuit 26 is connected to a secondary output winding 2c of the transformer 2. The output side rectifying and smoothing circuit 26 has a rectifying diode connected in series to the secondary output winding 2c, and a smoothing capacitor connected in parallel to the secondary output winding 2c.

The respective resistance values of series-connected dividing resistors 30 and 31 in an output voltage monitoring circuit 55 are determined such that, if an output voltage between a high-voltage side output line 20a and a low-voltage side output line 20b becomes a predetermined set voltage, voltage drop generated by the voltage dividing resistor 31 being one of the voltage dividing resistors 30 and 31 connected in series causes an NPN transistor 32 to operate actively. Accordingly, if the output voltage exceeds the set voltage, a current proportionate to a difference between these voltages flows in the photocoupler light emitting element 35. In response, the photocoupler light emitting element 35 emits light of an amount corresponding to the difference between the voltages.

An output current monitoring circuit 54 has a shunt resistor 3 connected in series to the low-voltage side output line 20b. The output current monitoring circuit 54 is configured such that, if an output current flowing in the shunt resistor 33 becomes a predetermined set current, voltage drop generated by the shunt resistor 33 causes an NPN transistor 34 to operate actively. Accordingly, if the output current exceeds the set current, a current proportionate to a difference between these currents flows in the photocoupler light emitting element 35. In response, the photocoupler light emitting element 35 emits light of an amount corresponding to the difference between the currents.

As described above, the photocoupler light emitting element 35 is optically coupled to the photocoupler light receiving element 36 belonging to the primary side of the transformer 2. Accordingly, if the output current exceeds the set current or the output voltage exceeds the set voltage, a discharging current corresponding to the excess flows from the driving capacitor 37 having been charged before the FET 3 is turned on into the electric resistor 52 and the primary current detecting resistor 51 during the ON period of the FET 3. Flow of the discharging current in the electric resistor 52 charges the OFF control capacitor 53 at a higher speed. In response, the OFF control capacitor 53 performs ON operation promptly, thereby shortening the ON period of the FET 3. As a result, energy stored in the transformer 2 during the ON period of the FET 3 is ON is reduced, so that the output voltage or the output current having exceeded the corresponding set value is controlled at the set voltage or the set current.

In the description given below regarding the operation of the self-excited switching power supply circuit 10 of the aforementioned structure, the operation thereof immediately after the power supply switch 4 is closed and the self-excited switching power supply circuit 10 is connected to the commercial AC power supply AC and started will be mainly described. When the power supply switch 4 is turned on to connect the self-excited switching power supply circuit 10 to the commercial AC power supply AC, the smoothing capacitor 1 is charged with a sinusoidal voltage having a waveform in which a half cycle of a sinusoidal wave obtained by rectification at a bridge rectifying circuit 7 appears repeatedly. If a resistive component connected to the smoothing capacitor 1 is not considered, an input voltage $V_{IN}$ of the DC input power supply 1 having a sinusoidal waveform and increasing from 0

Figure 3:
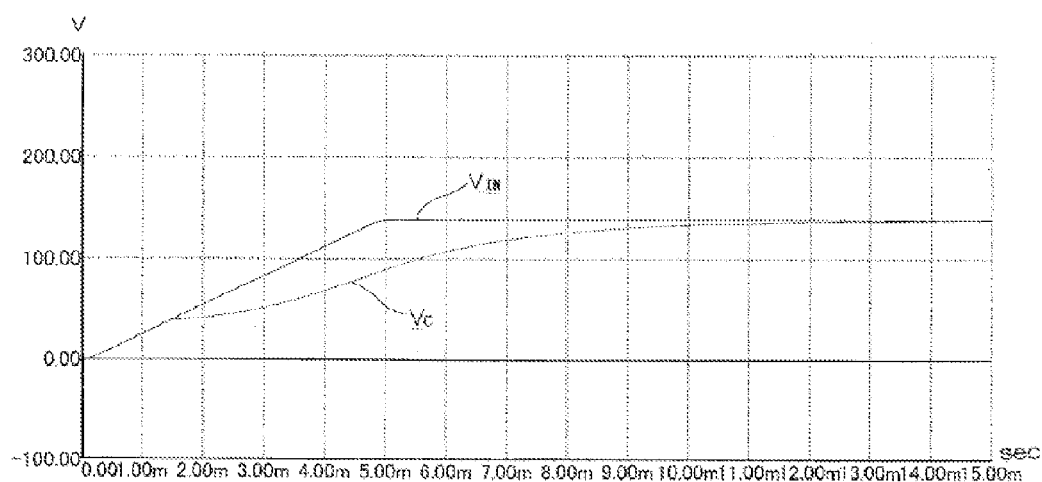
FIG. 3 is a waveform chart showing an input voltage $V_{IN}$ of a DC input power supply 1 and a charging voltage $V_C$ of a coupling capacitor 9 in comparison to each other that are determined immediately after the self-excited switching power supply circuit 10 is started.

V to 141 V appears between the high-voltage side terminal 1a and the low-voltage side terminal 1b as shown in FIG. 3.

During the transitional period in which the input voltage $V_{IN}$ of the DC input power supply 1 increases, the start-up capacitor 12 (in FIGS. 1 and 2, the lower electrode is a positive electrode and the upper electrode is a negative electrode) is charged with the DC input power supply 1 through the start-up resistor 21. At this time, the input voltage $V_{IN}$ of the DC input power supply 1 is also applied between the junction J2 between the start-up capacitor 12 and the feedback resistor 11, and the high-voltage side terminal 1a of the DC input power supply 1. However, a current does not flow between the junction J2 and the high-voltage side terminal 1a until the input voltage $V_{IN}$ reaches the Zener voltage (39 V) of the Zener diode 15. Accordingly, a charging voltage $V_C$ of the coupling capacitor 9 measured before the input voltage $V_{IN}$ of the DC input power supply 1 at 0 V reaches the Zener voltage of 39 V is the same as the input voltage $V_{IN}$ of the DC input power supply 1, and the start-up capacitor 12 is charged only with a charging current flowing in the start-up resistor 21.

When the charging voltage of the start-up capacitor 12 increases gradually to reach the threshold voltage $V_{TH}$ of the FET 3, a forward bias voltage is applied to the gate of the FET 3 to turn the FET 3 on (continuity is formed between the drain and the source). When the FET 3 is turned on and an exciting current starts to flow from the DC input power supply 1 to the primary winding 2a connected in series to the FET 3, induced electromotive force is generated in each winding of the transformer 2 to store energy in the transformer 2. An induced voltage generated in the feedback winding 2b is superimposed on the charging voltage of the start-up capacitor 12, so that the gate voltage of the FET 3 is maintained at the threshold voltage $V_{TH}$ of the FET 3 or a level (ON voltage) higher than the threshold voltage $V_{TH}$.

In an ON period during which the FET 3 is in operation, the OFF control capacitor 53 is charged with a voltage across the primary current detecting resistor 51 generated as a result of flow of the exciting current. The charging voltage of the OFF control capacitor 53 increases in response to the exciting current that increases in proportion to time elapsed after turn-on of the FET 3. When this charging voltage reaches the bias voltage of the OFF control transistor 5, continuity is formed between the collector and the emitter of the OFF control transistor 5 to bring the gate of the FET 3 into a state where the gate of the FET 3 is substantially shorted by the OFF control transistor 5, thereby turning the FET 3 off.

Turn-off of the FET 3 generates what is called a flyback voltage (induced counter-electromotive force) in each winding. Meanwhile, during the transitional period in which the smoothing capacitor 1 is charged further, especially during an initial stage of the transitional period, the input voltage $V_{IN}$ of the DC input power supply 1 has not increased sufficiently. This makes energy stored in the transformer 2 small, so that a flyback voltage has a low voltage value. As a result, the start-up capacitor 12 is not charged sufficiently with the flyback voltage of the feedback winding 2b in the transitional period.

Figure 9:
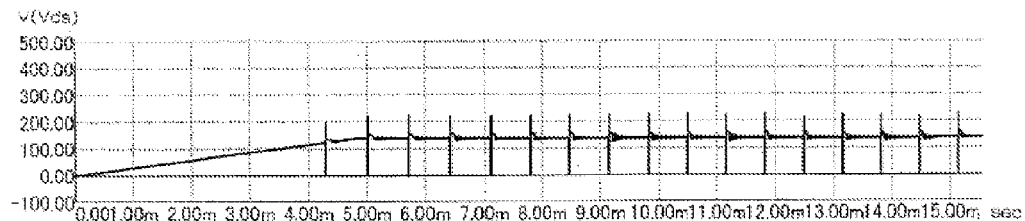
FIG. 9 is a waveform chart showing a voltage Vds between the drain and the source of an FET 3 determined immediately after the self-excited switching power supply circuit 100 is started.
Figure 10:
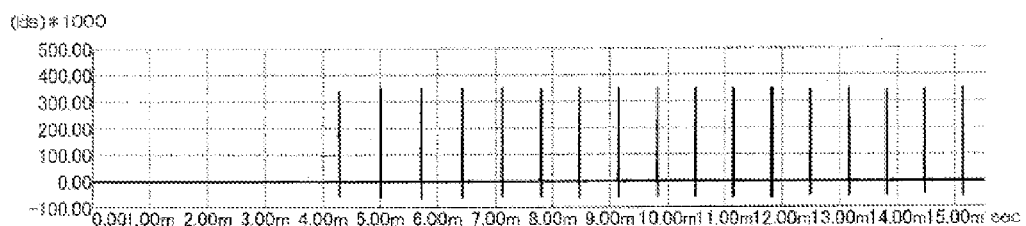
FIG. 10 is a waveform chart showing a current Ids between the drain and the source of the FET 3 determined immediately after the self-excited switching power supply circuit 100 is started.
Figure 11:
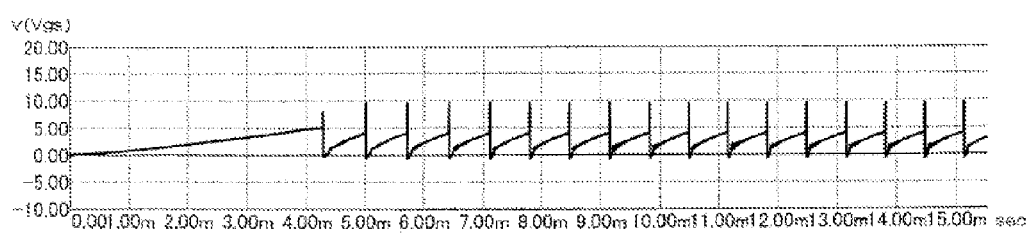
FIG. 11 is a waveform chart showing a voltage Vgs between the gate and the source of the FET 3 determined immediately after the self-excited switching power supply circuit 100 is started.
Figure 12:
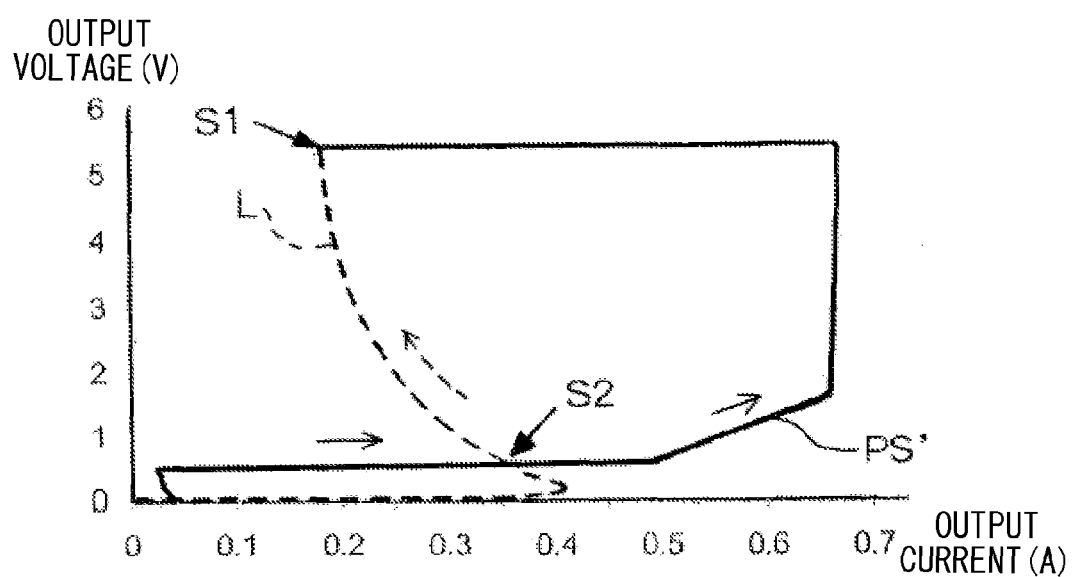
FIG. 12 is a waveform chart showing output characteristics PS' of the self-excited switching power supply circuit 100 and operating characteristics L of a load.

Meanwhile, if the input voltage $V_{IN}$ of the DC input power supply 1 exceeds the Zener voltage (39 V) of the Zener diode 15 during the transitional period in which the smoothing capacitor 1 is charged further, a potential difference is generated between the charging voltage $V_C$ of the coupling capacitor 9 and the input voltage $V_{IN}$ of the DC input power supply 1, causing a charging current trying to charge the coupling capacitor 9 starts to flow in the start-up auxiliary resistor 8. This charging current flows in a direction from the high-voltage side terminal 1a toward the junction J2. Accordingly, the start-up capacitor 12 is charged with a charging current flowing in the start-up resistor 21, and additionally with a charging current flowing in the bypass charging circuit 14 composed of the start-up auxiliary resistor 8 and the coupling capacitor 9. This shortens an OFF period from when the FET 3 is turned off and until when the FET 3 is turned on. Unlike the intermittent oscillating operation (see FIGS. 9 to 11) in the conventional self-excited switching power supply circuit 100, the self-excited switching power supply circuit 10 realizes continuous oscillating operation as shown in FIGS. 4 to 6 by performing the aforementioned oscillating operation repeatedly.

Figure 4:
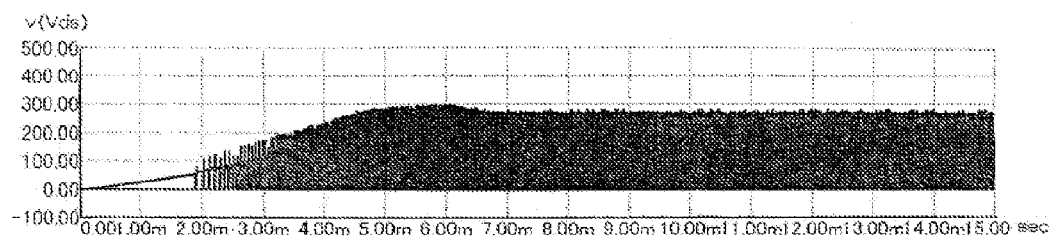
FIG. 4 is a waveform chart showing a voltage Vds between the drain and the source of an FET 3 determined immediately after the self-excited switching power supply circuit 10 is started.
Figure 5:
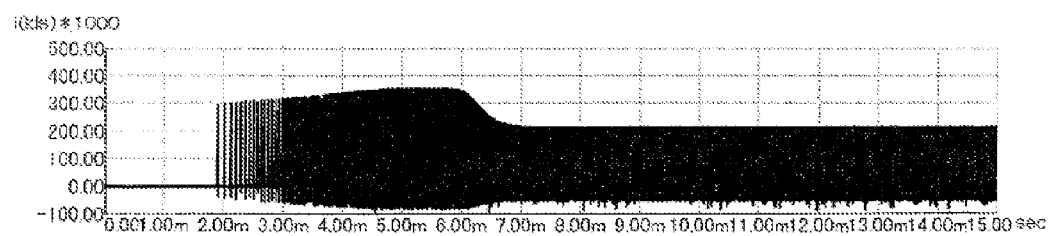
FIG. 5 is a waveform chart showing a current Ids between the drain and the source of the FET 3 determined immediately after the self-excited switching power supply circuit 10 is started.
Figure 6:
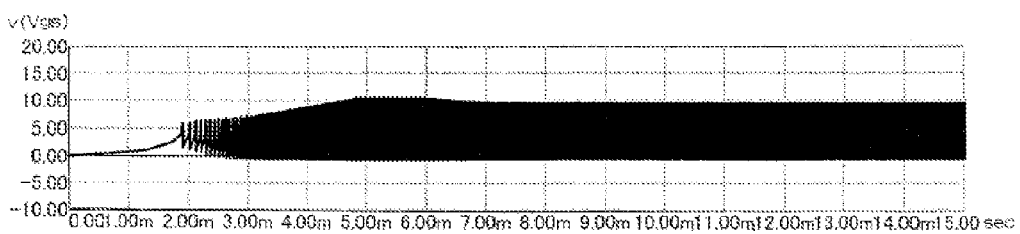
FIG. 6 is a waveform chart showing a voltage Vgs between the gate and the source of the FET 3 determined immediately after the self-excited switching power supply circuit 10 is started.

As shown in FIGS. 4 and 6, the self-excited switching power supply circuit 10 shifts to the continuous oscillating operation in the transitional period during which the input voltage $V_{IN}$ of the DC input power supply 1 increases immediately after the self-excited switching power supply circuit 10 is started. Accordingly, as shown by the output characteristics PS of the power supply circuit 10 shown in FIG. 7, an initial output current (short-circuit current) is equal to or higher than 0.5 A. Thus, the output characteristics PS of the self-excited switching power supply circuit 10 in operation do not agree with operating characteristics L even if a load having an initial operating current of about 0.4 A and having the operating characteristics L is connected between the output lines 20a and 20b, thereby preventing start-up failure.

If the smoothing capacitor 1 has been charged sufficiently and the input voltage $V_{IN}$ of the DC input power supply 1 has increased, a current flowing in the transformer 2 is interrupted substantially in an OFF period in each oscillation cycle during which the self-excited switching power supply circuit 10 performs the continuous oscillating operation. Accordingly, a flyback voltage is generated in each winding as described above. A flyback voltage generated in the secondary output winding 2c is rectified and smoothed by the output side rectifying and smoothing circuit 26, and is output as electric power to be supplied to a load connected between the output lines 20a and 20b. Further, a load connected to the output side makes a flyback voltage generated in the first feedback winding 2b proportionate to the flyback voltage generated in the secondary output winding 2c. The flyback voltage generated in the first feedback winding 2b is also supplied to the start-up capacitor 12 through the Zener diode 6 for charging. Increase of the input voltage $V_{IN}$ in the charge transitional period increases a charging current generated by the flyback voltage of the first feedback winding 2b and to be supplied to the start-up capacitor 12 gradually, thereby charging the start-up capacitor 12 at a higher speed. As a result, the OFF period of the FET 3 is shortened gradually as shown in FIGS. 4 to 6.

Figure 7:
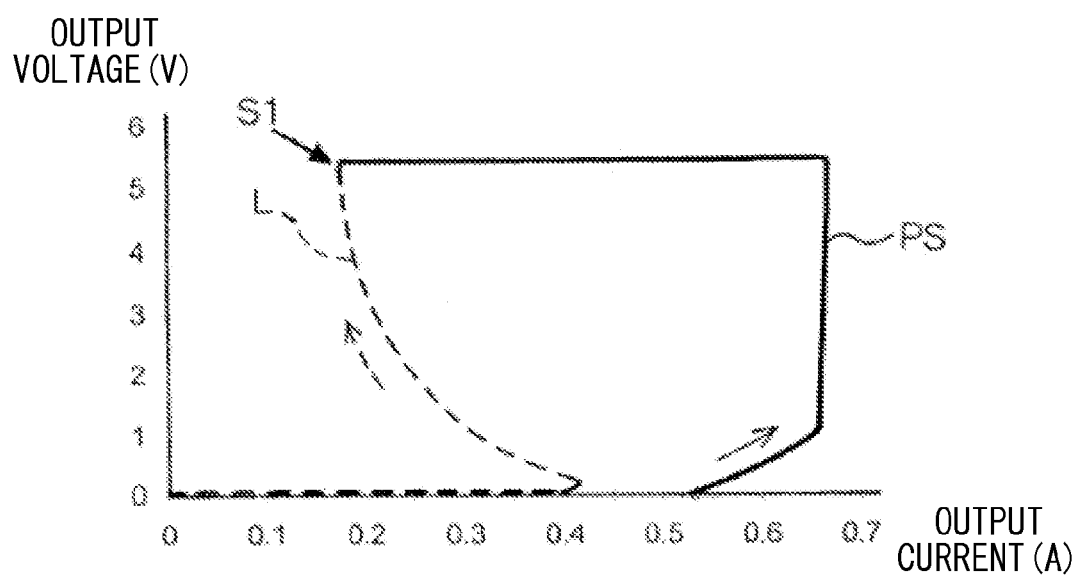
FIG. 7 is a waveform chart showing output characteristics PS of the self-excited switching power supply circuit 10 and operating characteristics L of a load.
Figure 8:
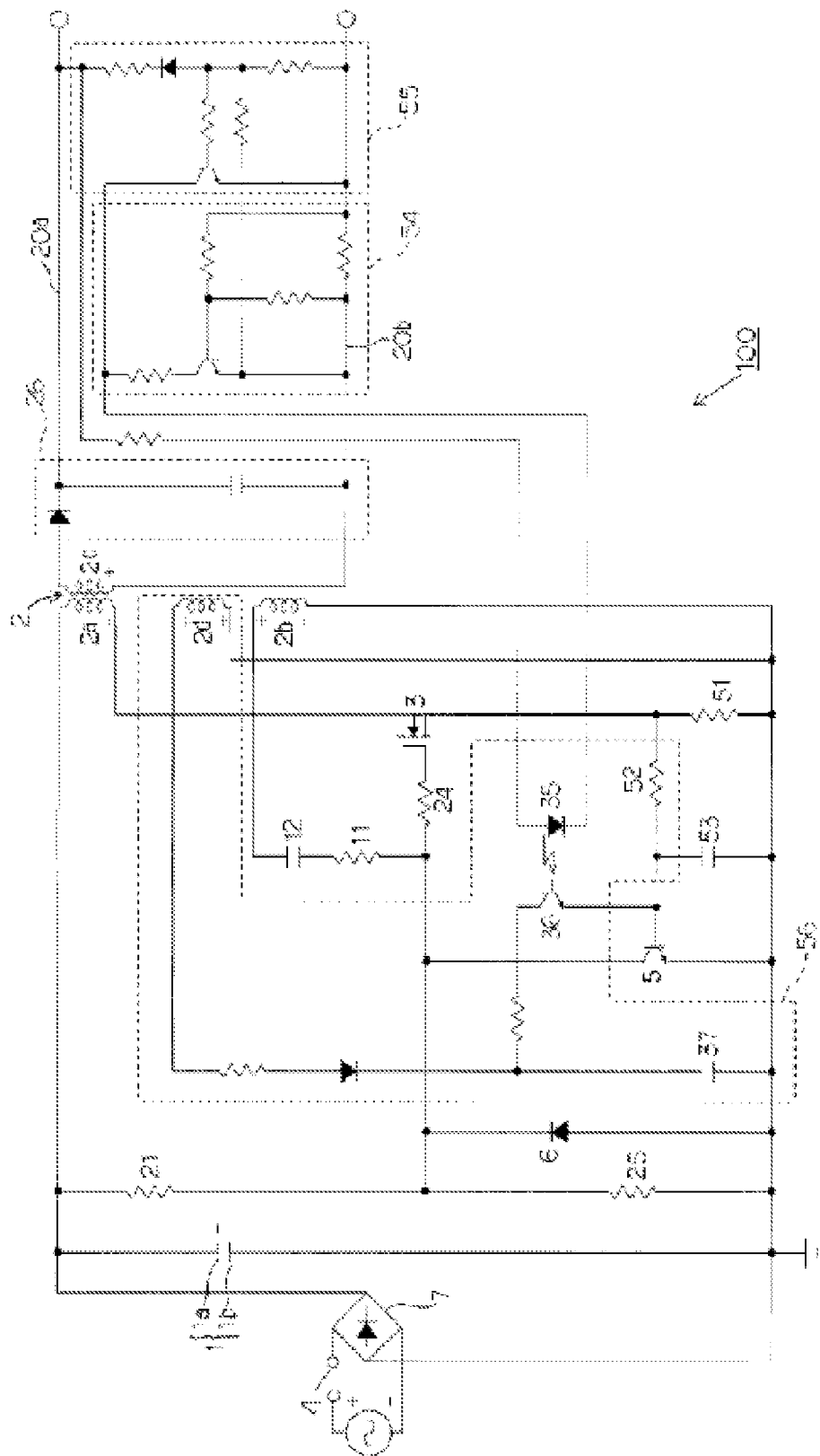
FIG. 8 is a circuit diagram of a conventional self-excited switching power supply circuit 100.

In the self-excited switching power supply circuit 10 making the continuous oscillation, the output current starts to increase from its initial output current of 0.5 A or higher measured after the self-excited switching power supply circuit 10 is started. If the output current exceeds the set current, the discharging current of the driving capacitor 37 flows into the electric resistor 52 in response to a difference between the output current and the set current as described above. This charges the OFF control transistor 53 at a higher speed to shorten the ON time of the FET 3, thereby achieving constant current control for controlling the output current at the set current. As shown in FIG. 7, the output voltage increases gradually under the constant current control. If the output voltage exceeds the set voltage, the voltage monitoring circuit 55 detects a difference between the output voltage and the set voltage, thereby achieving constant voltage control by which the ON time of the FET 3 is also shortened in response to the difference between the voltages. Here, the set voltage is determined to be the general operating voltage of a load to be connected. The load consumes energy stored in the transformer 2 in each oscillation cycle under the constant voltage control. Further, the charging voltage of the start-up capacitor 12 keeps the gate voltage of the FET 3 at a level not exceeding the threshold voltage $V_{TH}$ of the FET 3 until a flyback voltage is reduced. As a result, turn-on of the FET 3 is delayed gradually and the output current is reduced, so that the stable and continuous oscillating operation appropriate for energy consumption by the load is repeated while characteristics S1 (here, with the output voltage of 5.5 V and the output current of about 0.18 A) showing agreement of the output current with the general operating current of the load are provided.

In the embodiment, a time constant is determined such that the transitional period of the coupling capacitor 9 is longer than the transitional period of the input voltage $V_{IN}$ of the DC input power supply 1, namely the transitional period of the smoothing capacitor 1. Thus, the charging voltage $V_C$ of the coupling capacitor 9 reaches the input voltage $V_{IN}$ after the self-excited switching power supply circuit 10 shifts to the stationary state where the input voltage $V_{IN}$ has reached the peak value (141 V), thereby stopping a charging current flowing in the bypass charging circuit 14. As a result, after the self-excited switching power supply circuit 10 shifts to the stable and continuous oscillating operation in the stationary state, the start-up capacitor 12 is charged only with the input voltage $V_{IN}$ through the start-up resistor 21 and with the flyback voltage generated in the first feedback winding 2b in the OFF period of the FET 3. Thus, using the start-up resistor 21 having a high resistance value allows reduction of power consumption during the continuous oscillating operation or in a standby state where a load is not connected.

As described above, the start-up capacitor 12 is charged at a higher speed with a charging current flowing in the bypass charging circuit 14 in the transitional period during which the input voltage $V_{IN}$ increases, thereby shortening the OFF period of the FET 3. This prevents the start-up failure. However, a flyback voltage remains in the secondary side of the transformer 2. Accordingly, even when a flyback voltage opposite in polarity to the DC input power supply 1 is generated in the primary winding 2a, the gate voltage of the FET 3 may reach the threshold voltage $V_{TH}$ to turn the FET 3 on. An excessive current may be generated during turn-on of the FET 3, leading to a different problem of breakdown of a circuit element. In view of this problem, in the embodiment, the Zener diode 15 is connected in series to the bypass charging circuit 14, so that a charging current is caused to flow in the bypass charging circuit 14 after the input voltage $V_{IN}$ reaches the Zener voltage. Thus, connection of the Zener diode 15 extends the time from a time immediately after the self-excited switching power supply circuit 10 is started shown in FIG. 3 until a time when a charging current starts to flow. Further, a difference between the input voltage $V_{IN}$ and the charging voltage $V_C$ of the coupling capacitor 9, namely a charging current to flow in the start-up auxiliary resistor 8 can be reduced. This allows the Zener voltage of the Zener diode 15 to control a speed at which the start-up capacitor 12 is charged, making it possible to control the OFF period of the FET 3 such that the FET 3 is turned off after disappearance of a flyback voltage is confirmed.

Meanwhile, the aforementioned problem may not occur depending on a load to be connected. In this case, the Zener diode 15 may not be connected, and the start-up capacitor 12 may be charged with a charging current flowing in the bypass charging circuit 14 from a time immediately after the self-excited switching power supply circuit 10 is started when the input voltage $V_{IN}$ is 0 V, thereby shifting to the continuous oscillating operation at an earlier stage.

The order in which the start-up auxiliary resistor 8, the coupling capacitor 9, and the Zener diode 15 are connected in series is not limited to that described in the aforementioned embodiment but may be determined freely, as long as the cathode of the Zener diode 15 is connected to the high-voltage side terminal 1a of the DC input power supply 1.

The embodiment is applied suitably to a capacitor input switching power supply circuit to be connected to a commercial AC power supply AC.

What is claimed is:

1. A self-excited switching power supply circuit comprising:
   a smoothing capacitor for generating a DC input power supply between a high-voltage side terminal and a low-voltage side terminal, the DC input power supply being generated by rectifying and smoothing a commercial AC power supply;
   a transformer with a primary winding, a secondary output winding, and a feedback winding;
   an oscillation field effect transistor connected in series to the primary winding and connected between the high-voltage side terminal and the low-voltage side terminal;
   a start-up resistor connected between the high-voltage side terminal and a gate of the oscillation field effect transistor;
   a start-up capacitor connected between one side of the feedback winding and the gate of the oscillation field effect transistor, an opposite side of the feedback winding being connected to the low-voltage side terminal, the start-up capacitor applying a voltage for controlling ON of the oscillation field effect transistor to the gate; and
   a control switching element connected between the gate of the oscillation field effect transistor and the low-voltage side terminal, the control switching element emitting the charging voltage of the start-up capacitor after elapse of a predetermined time after the oscillation field effect transistor is turned on, thereby controlling OFF of the oscillation field effect transistor, wherein
   the self-excited switching power supply circuit rectifies and smoothes a flyback voltage generated in the secondary output winding after the oscillation field effect transistor is turned off, and outputs the resultant flyback voltage,
   a bypass charging circuit connected in parallel to the start-up resistor is connected between the high-voltage side terminal and the gate of the oscillation field effect transistor, and
   the bypass charging circuit causes a charging current for charging the start-up capacitor to flow from the high-voltage side terminal at least in a fixed period of a transitional period during which the voltage of the DC input power supply increases.

2. The self-excited switching power supply circuit according to claim 1, wherein the bypass charging circuit includes a start-up auxiliary resistor and a coupling capacitor connected in series.

3. The self-excited switching power supply circuit according to claim 2, wherein a Zener diode having a Zener voltage lower than a voltage of the DC input power supply measured after elapse of the transitional period is connected in series to the bypass charging circuit.

\* \* \* \* \*